June 2, 1942.  C. J. CHRISTENSEN  2,285,017
COATING APPARATUS
Filed Feb. 8, 1940
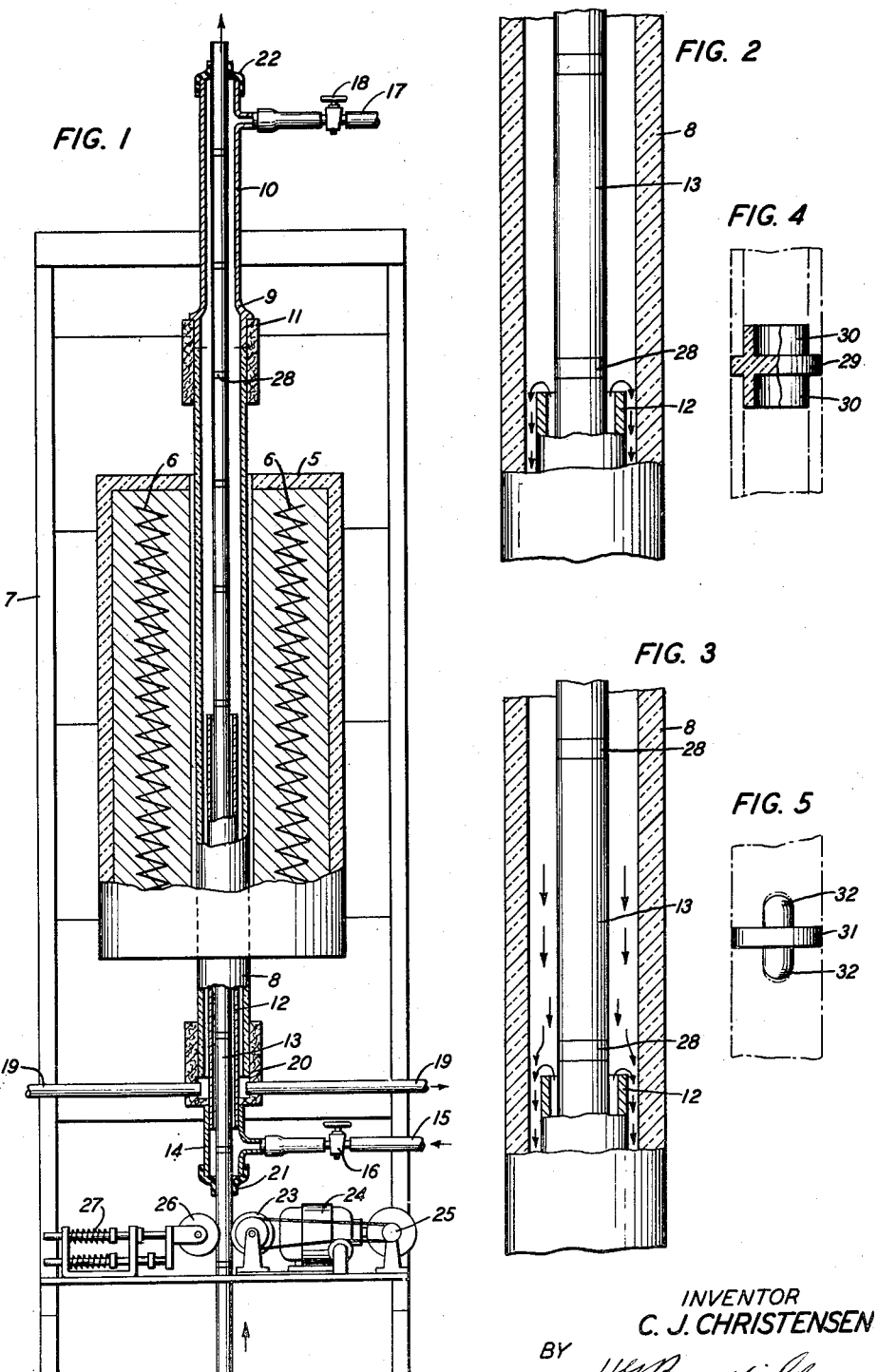
INVENTOR
C. J. CHRISTENSEN
BY
H. G. Bandfield
ATTORNEY Patented June 2, 1942

2,285,017

UNITED STATES PATENT OFFICE 2,285,017

COATING APPARATUS

Carl J. Christensen, Flushing, N. Y., assignor to Bell Telephone Laboratories, Incorporated, New York, N. Y., a corporation of New York Application February 8, 1940, Serial No. 317,834

4 Claims. (Cl. 91—18)

This invention relates to carbon coating apparatus and more particularly to apparatus for coating bodies with a layer of hard carbon by deposition from a hydrocarbon gas.

It is well known to deposit a coating of carbon on ceramic bodies by heating the bodies to the required temperature and subjecting them to a stream of a hydrocarbon gas so that the gas in contacting with the heated bodies is decomposed and the resulting carbon is deposited on the bodies as a coating of a thickness depending primarily upon the duration of the treatment, the concentration of the hydrocarbon gas and the temperature. Various types of apparatus have been proposed for coating ceramic bodies either employing a "batch" method or a continuous method when the shape of the bodies to be coated is such as to permit the use of a continuous method. However, in order to obtain a coating free from soot, it has heretofore been generally considered necessary to keep the bodies in a stream of a neutral gas during the treatment except for that period in which they are in the hot zone of the furnace and to cause a rotation or tumbling of the bodies to insure a uniform coating.

It is the principal object of the present invention to apply a uniform coating of hard carbon and one free from soot without resorting to the use of a neutral gas except as mixed with the carbon yielding gas.

It is another object of the invention to apply such a coating on ceramic tubes or rods by means of a process which permits the ceramic bodies to pass through the furnace in a continuous stream.

To accomplish these and other objects there is provided in accordance with the invention a vertical type of furnace in which a hydrocarbon gas mixed with a neutral gas surrounds the ceramic bodies as they are conveyed into the furnace but is discharged from the furnace at approximately the hottest point so that the temperature of the bodies as they pass from the hot zone is always higher than that of the gas. If the hot gas with its decomposition products is allowed to contact a colder ceramic, a sooting of the ceramic results, but when the ceramic is hotter than the gas and a suitable decomposition chamber is provided there exists a so-called "conduction zone" around the ceramic bodies which is a gas layer of high viscosity through which soot does not penetrate and hence the bodies are not contaminated by a deposit of soot. In order to avoid sooting it is not necessary that the ceramics entering or leaving the furnace be in a neutral gas but only that the gas surrounding the bodies after they leave the hot zone be at a lower temperature than the bodies which it contacts.

A more uniform coating than has been obtained heretofore results from passing the ceramic bodies through the hot zone of the furnace in a vertical column and without resorting to the use of guiding members. Due to the temperature gradient convection currents exist in the coating furnace and when the ceramics pass through the furnace in a vertical column, there is a cylindrical symmetry of the convection currents with respect to the ceramics and hence a uniform coating is obtained all around the circumference of the ceramic. If the ceramic column were horizontal, this cylindrical symmetry of convection with respect to the ceramic would not exist and a non-uniform coating around the circumference of the ceramic would result unless the ceramic were rotated along its axis. The use of a rotating means introduces a complication into the furnace construction and if guiding members are employed the conduction zone does not form where they contact with the ceramic, resulting in a non-uniform coating and the introduction of soot.

The various features of the invention may be more clearly understood by reference to the accompanying drawing in which Fig. 1 is an elevation view showing one embodiment of the invention;

Fig. 2 is an enlarged view showing more clearly the direction of flow of the hydrocarbon gas in the preferred arrangement;

Fig. 3 is an enlarged view showing the direction of flow of the hydrocarbon gas in a modified arrangement; and Figs. 4 and 5 are views partly in cross-section showing spacing elements for maintaining the ceramics in position as they pass through the furnace.

Referring to the drawing, an electric furnace 5 provided with suitable heating elements 6—6 is mounted in a vertical position on a supporting framework 7. Extending through the furnace in a vertical direction is a tubular member 8 of ceramic material, such as quartz or sillimanite. The upper end of the member 8 is joined to the funnel-shaped end 9 of discharge tube 10, a suitable packing material 11 being provided to insure a gas-tight seal. Concentrically positioned within the lower end of member 8 is a sheath tube 12 which extends to approximately the mid-point of the furnace. The inner diameter of this sheath tube, which is preferably of quartz or similar ceramic material, is somewhat larger than the outer diameter of the ceramic bodies 13 which are to be coated, while the outer diameter of this tube is less than the inner diameter of tubular member 8 to permit the free flow of gas therebetween. The lower end of sheath tube 12 terminates in a hollow T-member 14 into which the hydrocarbon gas enters through inlet pipe 15 provided with a suitable valve 16. A second inlet pipe 17 provided with a control valve 18 is provided at the upper end of member 8. Outlet pipes 19—19 are provided as shown for discharging the stream of gas leaving the furnace between tubes 12 and 8. Packing material 20 is provided to insure a gas-tight seal. A gland 21, preferably of soft rubber, is provided at the lower end of sheath tube 12 to insure a substantially gas-tight seal with the column of ceramics as they enter the furnace. A similar gland 22 is provided at the upper end of the furnace to prevent the escape of gas with the ceramics as they pass out of the furnace.

For conveying the ceramic bodies through the furnace at a uniform and predetermined rate, a mechanism is provided consisting of a fixed grooved pulley 23 driven by means of a motor 24 through a suitable speed-reducing means 25 and a grooved pulley 26 which is pressed against the ceramic bodies by spring mechanism 27.

In order to maintain the ceramic bodies, as they pass through the furnace, in a fixed vertical column, spacing members 28 are provided having an outer diameter substantially that of the bodies to be coated. As a rule, the ceramics are tubular in shape and coated only on the outer surface, in which case a ceramic spacer is employed as illustrated in Fig. 4, having a central portion 29 substantially the outer diameter of the ceramic to be coated and end portions 30—30 of suitable diameter to fit within the bores of the ceramics. In case the ceramic bodies comprise solid rods, a spacer may be employed of the type shown in Fig. 5. This spacer is provided with a central portion 31 substantially the same diameter as the ceramics to be coated and projecting portions 32—32 which are adapted to fit in corresponding openings in the ceramics.

In the operation of this apparatus, the ceramics to be coated are provided with suitable spacers and propelled by means of pulleys 23, 26 at a predetermined uniform speed through gland 21 and sheath tube 12 to the central portion or hot zone of furnace 5 where decomposition of the hydrocarbon gas takes place. The hydrocarbon gas enters the inlet pipe 15 and surrounds the ceramics as they pass upward through sheath tube 12. While this gas may consist of a mixture of a neutral gas with a carbon bearing gas, such as carbon monoxide, petroleum ether, benzene, etc., the most satisfactory results have been obtained with a mixture of nitrogen and pure methane, the commercial methane being purified by a process such as that disclosed in my copending application, Serial No. 245,340, filed December 13, 1938. As the refractories pass upward through the furnace in a continuous stream, they leave the hot zone and are discharged through tube 10 and gland 22, which prevents an appreciable escape or outward flow of gas. Preferably, valve 18 of inlet tube 17 is closed so that the flow of gas upon leaving sheath tube 12 follows, in general, the direction of the arrows as shown in Fig. 2, there being no appreciable flow of gas in the upper portion of tube 8.

The hot zone of the furnace is preferably maintained at a temperature of from 900° C. to 1200° C. The pure methane does not decompose until the higher temperatures of the furnace are reached, and the appearance of soot is delayed until after a chemical induction period of finite time so that no soot is deposited on the ceramics while they are being conducted to the hot zone of the furnace. At the hot zone the ceramics receive their coating of hard carbon, then pass on to the cooler exit regions of the furnace. This movement of the ceramics from the hot zone of the furnace toward the cold outlet gland 22 causes the coated ceramics to be hotter than the contiguous gas, thus creating a temperature gradient between the coated ceramic tubes and the furnace tube 8. If the furnace tube 8 is not too small in diameter, this gives rise to a "conduction zone" around the coated ceramics in their progress toward the outlet which protects them from the deposition of soot.

In case a greater temperature gradient should be found desirable to meet certain conditions, this may be brought about by also passing hydrocarbon gas into the furnace through auxiliary inlet pipe 17 and valve 18. This stream of cold gas will prevent the accumulation of a body of stagnant heated gas that would otherwise form in the upper portion of the furnace, and thus increases the temperature gradient. Under these operating conditions the direction of flow of hydrocarbon gas in the furnace will be in the directions indicated by the arrows in Fig. 3.

While it would be possible to remove the coating gas from the furnace by means of vents at the center of the hot zone, such a construction would be more complicated than the proposed method in which space is provided between tubes 8 and 12 for the removal of the gas from the hot zone.

Following the proposed method, either with or without passing a stream of hydrocarbon gas counter to the movement of the ceramics, it has been found possible to provide the ceramics with uniform coatings of hard carbon entirely devoid of soot without resorting to the use of neutral gases or unnecessary complications in the construction of the furnace.

What is claimed is:

1. Apparatus for coating bodies with a layer of hard carbon by deposition from a hydrocarbon gas comprising a furnace maintained at a temperature such as to cause thermal decomposition of the hydrocarbon gas, a tube for conveying the bodies into said furnace, a second tube in axial alignment with said first tube but separated therefrom for conveying said bodies out of said furnace, means for causing the flow of a hydrocarbon gas in said first tube, and means for discharging said gas from approximately the hottest portion of said furnace in a direction opposite to the direction of flow of said gas into the furnace.

2. Apparatus for coating bodies with a layer of hard carbon by deposition from a hydrocarbon gas, comprising a furnace maintained at a suitable temperature to cause thermal decomposition of the hydrocarbon gas, a tube extending vertically through said furnace, a second tube extending into the central portion of said furnace, and in axial alignment with said first tube, the inner diameter of said first tube being sufficiently larger than the outer diameter of said second tube to permit the free flow of hydrocarbon gas therebetween, and means for passing the bodies to be coated through said furnace at a predetermined rate.

3. Apparatus for coating bodies with a layer of hard carbon by deposition from a hydrocarbon gas, comprising a vertical furnace maintained at a suitable temperature to cause thermal decomposition of the hydrocarbon gas, a tube extending vertically through said furnace, a second tube concentric with said first tube extending into said furnace and adapted to convey the bodies to be coated into said furnace, means for passing said bodies through said furnace at a predetermined rate, and means for maintaining said bodies in a self-sustained column.

4. Apparatus for coating bodies with a layer of hard carbon by deposition from a hydrocarbon gas, comprising a vertical furnace maintained at a suitable temperature to cause thermal decomposition of the hydrocarbon gas, a tube extending vertically through said furnace, a second tube concentric with said first tube extending into said furnace and adapted to convey the bodies to be coated into said furnace, means for passing said bodies through said furnace at a predetermined rate, and means for maintaining said bodies in a self-sustained column, said means comprising refractory spacing elements having a central portion of a diameter corresponding to the outer diameter of the bodies to be coated and projecting portions cooperating with openings in said bodies to maintain said bodies in a vertical column.

CARL J. CHRISTENSEN.